(12) United States Patent
Hayashi et al.

(10) Patent No.: US 7,494,335 B2
(45) Date of Patent: Feb. 24, 2009

(54) APPARATUS FOR PRODUCING RUBBER STRIP

(75) Inventors: Norio Hayashi, Kobe (JP); Hiroyuki Onimatsu, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 198 days.

(21) Appl. No.: 11/206,749

(22) Filed: Aug. 19, 2005

(65) Prior Publication Data

US 2006/0057243 A1    Mar. 16, 2006

(30) Foreign Application Priority Data

Sep. 14, 2004    (JP) .............................. 2004-267174

(51) Int. Cl.
*B29C 47/00* (2006.01)
(52) U.S. Cl. .................. 425/382 R; 425/327; 425/464; 425/376.1
(58) Field of Classification Search ............. 425/382 R, 425/327, 464, 113, 376.1
See application file for complete search history.

(56) References Cited

U.S. PATENT DOCUMENTS

| 1,919,361 | A |   | 7/1933 | Farrington |  |
|---|---|---|---|---|---|
| 2,197,988 | A | * | 4/1940 | Tanzi | 425/189 |
| 3,557,265 | A | * | 1/1971 | Chisholm et al. | 264/46.1 |
| 4,015,926 | A | * | 4/1977 | Nehmey | 425/464 |
| 4,290,989 | A | * | 9/1981 | Topor et al. | 264/142 |
| 4,395,217 | A | * | 7/1983 | Benadi' | 425/382 R |
| 4,445,838 | A | * | 5/1984 | Groff | 425/319 |
| 5,030,079 | A | * | 7/1991 | Benzing, II | 425/140 |
| 5,453,238 | A | * | 9/1995 | Bardy | 264/174.11 |
| 5,474,720 | A | * | 12/1995 | Topf | 264/40.1 |
| 2002/0048615 | A1 | * | 4/2002 | Ohki | 425/145 |
| 2006/0076703 | A1 | * | 4/2006 | Looman et al. | 264/167 |

FOREIGN PATENT DOCUMENTS

| EP | 1 186 397 A2 | 3/2002 |
|---|---|---|
| EP | 1 201 397 A2 | 5/2002 |
| JP | 9-239863 A | 9/1997 |
| JP | 2000-254980 A | 9/2000 |
| JP | 2002-79590 A | 3/2002 |
| JP | 2005-111826 A | 4/2005 |

* cited by examiner

*Primary Examiner*—Yogendra Gupta
*Assistant Examiner*—Maria Veronica D Ewald
(74) *Attorney, Agent, or Firm*—Birch, Stewart, Kolasch & Birch, LLP

(57) ABSTRACT

The present invention relates to an apparatus for producing at least two rubber strips comprising an extruder for extruding compounded rubber into at least two preliminary rubber strips each having a preliminary cross sectional shape, and a pair of calendar rollers for simultaneously forming the preliminary rubber strips into at least two rubber strips each having a finished cross sectional shape.

16 Claims, 6 Drawing Sheets

APPARATUS FOR PRODUCING RUBBER STRIP

FIELD OF THE INVENTION

The present invention relates to an apparatus for producing rubber strips capable of simultaneously and precisely forming a plurality of rubber strips from one extruder.

DESCRIPTION OF THE BACKGROUND ART

In a pneumatic tire, in order to sufficiently exhibit characteristics of its various portions, a tread rubber component, a sidewall rubber component, a clinch rubber component and an inner liner rubber component are made of different compounds. Further, when the pneumatic tire is to be produced, the rubber components mentioned above are extruded into different cross sectional shapes and are supplied to a tire former.

In recent years, a strip wind method is proposed to form the rubber components. According to the strip wind method, as shown in FIG. 7(A) for example, a ribbon-like unvulcanized rubber strip "a" is continuously wound around a tire former (not shown) spirally, thereby obtaining a rubber component b having desired cross sectional shape. FIG. 7(A) shows a tread rubber component c as one example of the rubber component b.

Further, in recent years, a dual wind method is proposed as shown in FIG. 7(B). According to this method, two rubber strips a1 and a2 are simultaneously wound around the former from opposite ends thereof in its widthwise direction toward its center. FIG. 7(C) shows another example of the dual wind method. According to this method, two rubber strips a1 and a2 are round around the former from its center toward its opposite ends.

In the dual wind method, it is necessary to simultaneously supply a plurality of rubber strips to the tire former. Therefore, the conventional method requires extruders for extruding compounded rubber in accordance with the number of rubber strips. The conventional method as a problem that the number of extruders is increased and equipment cost is increased.

SUMMARY OF THE INVENTION

It is a main object of the present invention to provide an apparatus for producing rubber strips capable of simultaneously forming at least two rubber strips using one extruder. This makes it possible to reduce the number of extruders to be used, and to lower apparatus costs.

According to the present invention, an apparatus for producing at least two rubber strips comprises:

an extruder for extruding compounded rubber, said extruder comprising a main body having an extrusion opening, and a die attached to the main body, said die comprising an inlet port in communication with the extrusion opening of the main body, at least two outlet ports from which the compounded rubber is extruded into at least two preliminary rubber strips each having a preliminary cross sectional shape, and a rubber passage extending between the inlet port and the outlet ports so as to distribute the compounded rubber supplied from the inlet port to each outlet port; and a pair of calendar rollers for simultaneously forming said at least two preliminary rubber strips into at least two rubber strips each having a finished cross sectional shape.

DETAILED DESCRIPTION OF THE PREFERRED EMBODIMENTS

Figure 1:
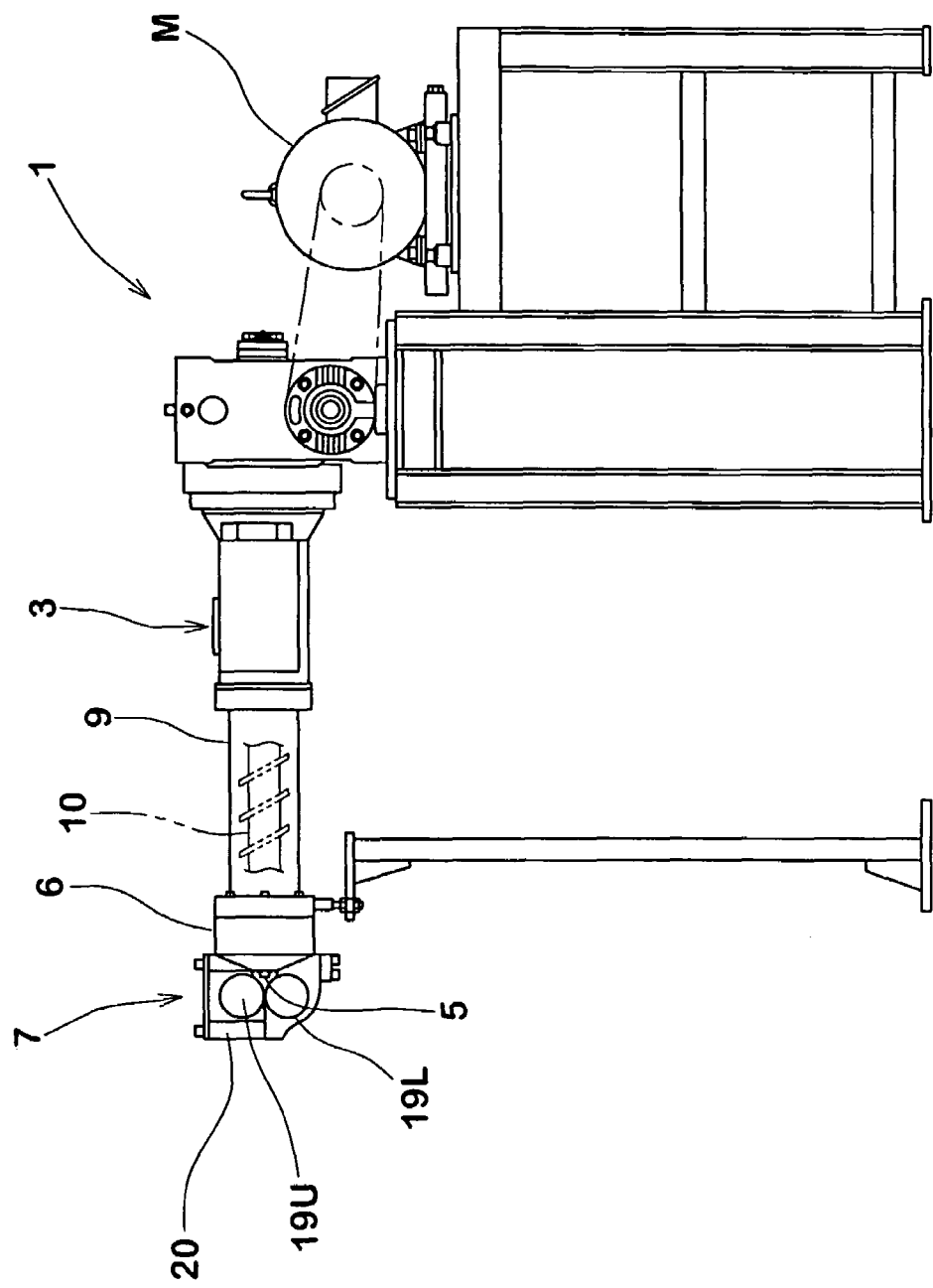
FIG. 1 is a side view of an apparatus for producing rubber strips according to an embodiment of the present invention.
Figure 2:
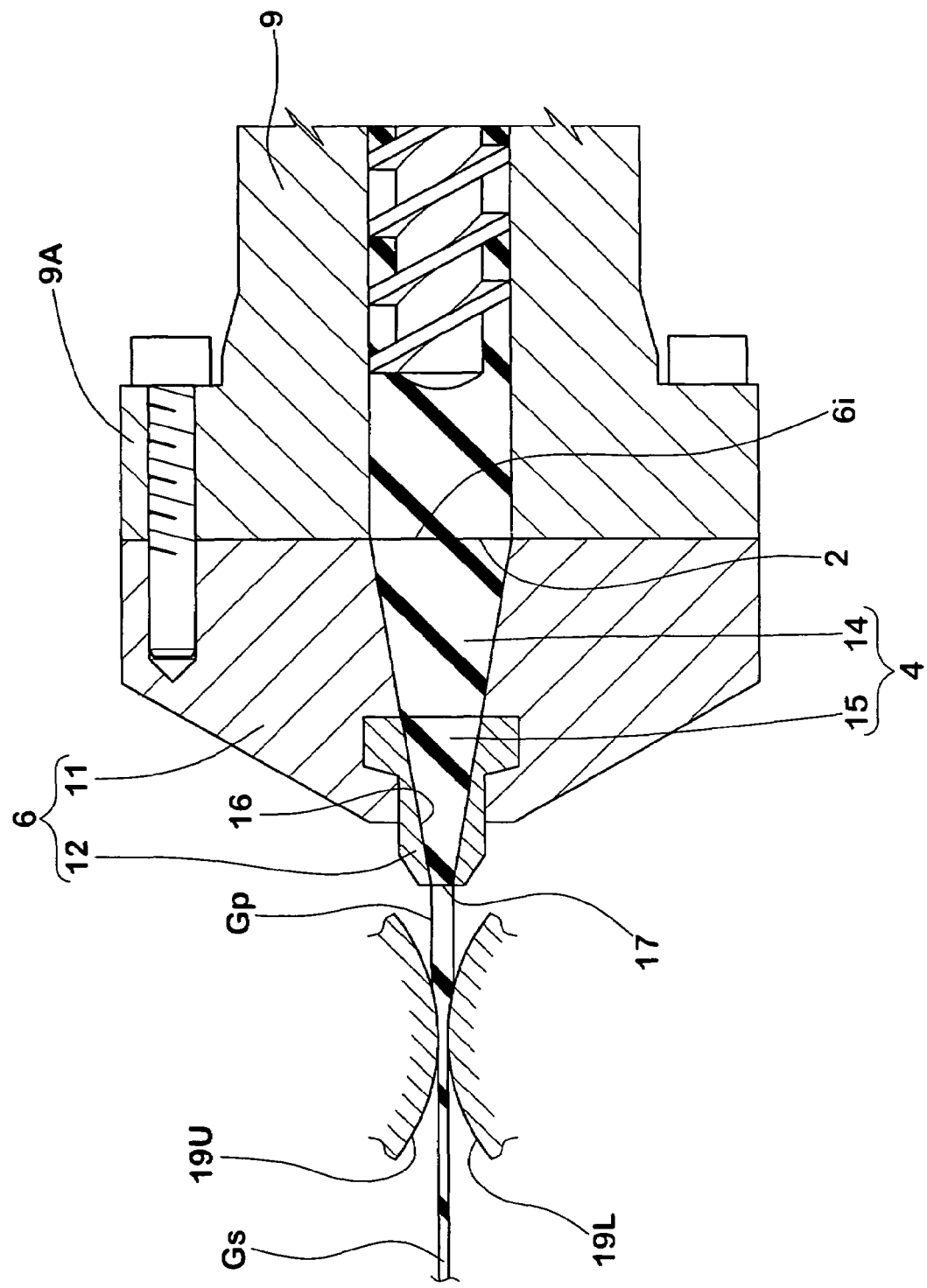
FIG. 2 is an enlarged sectional view of an essential portion of the apparatus.

In FIGS. 1 and 2, an apparatus 1 for producing rubber strips (simply "the apparatus", hereinafter in some cases) comprises an extruder 3 for extruding compounded rubber into at least two preliminary rubber strips Gp each having a preliminary cross sectional shape, and a calendar head 7 having a pair of calendar rollers 19U, 19L for simultaneously forming the preliminary rubber strips Gp into at least two rubber strips Gs each having a finished cross sectional shape.

Figure 6:
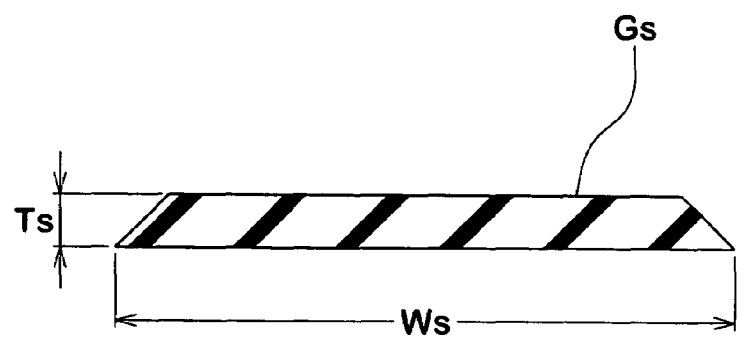
FIG. 6 is a cross sectional view of an example of a finished rubber strip.
Figure 7A:
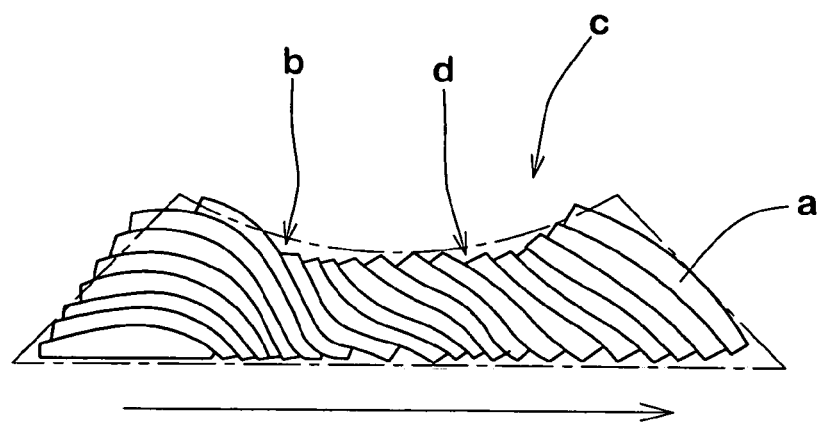
FIG. 7(A) is a cross sectional view used for explaining a strip wind method.
Figure 7B:
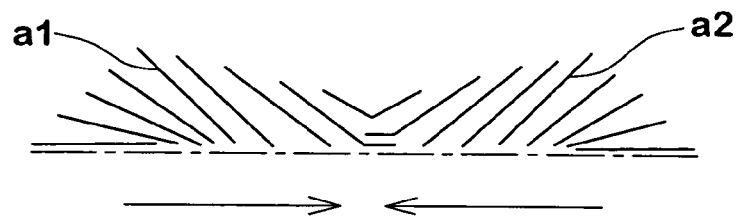
FIGS. 7(B) and 7(C) are diagrams used for conceptually explaining dual wind.
Figure 7C:
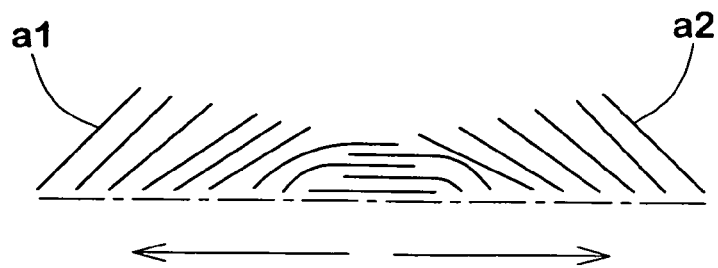

The apparatus 1 of this embodiment is used for forming a tire rubber component by the dual wind method. As shown in FIG. 6, the apparatus 1 of the embodiment can produce two rubber strips Gs each having a strip width Ws of from 5 mm to 30 mm and a strip thickness Ts of from 0.5 mm to 2.0 mm.

The two rubber strips Gs are supplied to the tire former having a cylindrical surface (not shown) at relatively high temperature, i.e., without through a cooling step, and are wound around the former spirally. with this, since adhesion of the rubber strips Gs is not deteriorated, it is possible to efficiently form a tire rubber component in which rubber strips are strongly and integrally bonded to each other.

The rubber strip Gs of the embodiment has a substantially trapezoidal cross section. A rubber strip having a substantially trapezoidal, triangular or crescentic cross sectional shape whose opposite side ends are tapered is of utility for forming a tire rubber component having a smooth surface.

The rubber extruder 3 comprises: a main body 9 like a barrel; a die 6 attached to the main body 9; a screw shaft 10 disposed in the main body 9; and an electric motor M for driving the screw shaft 10. The main body 9 is provided at its front end with an extrusion opening 2 through which rubber is discharged out. If the screw shaft 10 rotates, rubber in the main body 9 is compounded therein and extrude from the extrusion opening 2 in this state.

The die 6 comprises: an inlet port 6i which is in communication with the extrusion opening 2 of the main body 9; at least two outlet port 17A and 17B from which the compounded rubber is extruded into the two preliminary rubber strips Gp; and a rubber passage 4 extending between the inlet port 6i and the outlet ports 17A and 17B so as to distribute the compounded rubber supplied from the inlet port 6i to each outlet ports 17A and 17B.

As shown in FIG. 2, the die 6 comprises a block-like die head 11, and a mouthpiece 12 which is detachably mounted on a front side (front side is downstream side of rubber flow) of the die head 11. The die head 11 is attached to a flange portion 9A of a front end of the main body 9 by means of a fixing tool such as a bolt that can be removed.

The die head 11 has the inlet port 6i, and the mouthpiece 12 has the two outlet ports 17A and 17B.

The rubber passage 4 comprises a first passage part 14 extending in the die head 11, and a second passage part 15 following the first passage part 14 at the downstream side and extending in the mouthpiece 12. In this embodiment, a cross sectional area of the rubber passage 4 is gradually reduced toward the downstream side. with this design, it is possible to extrude the compounded rubber under high pressure.

Figure 4:
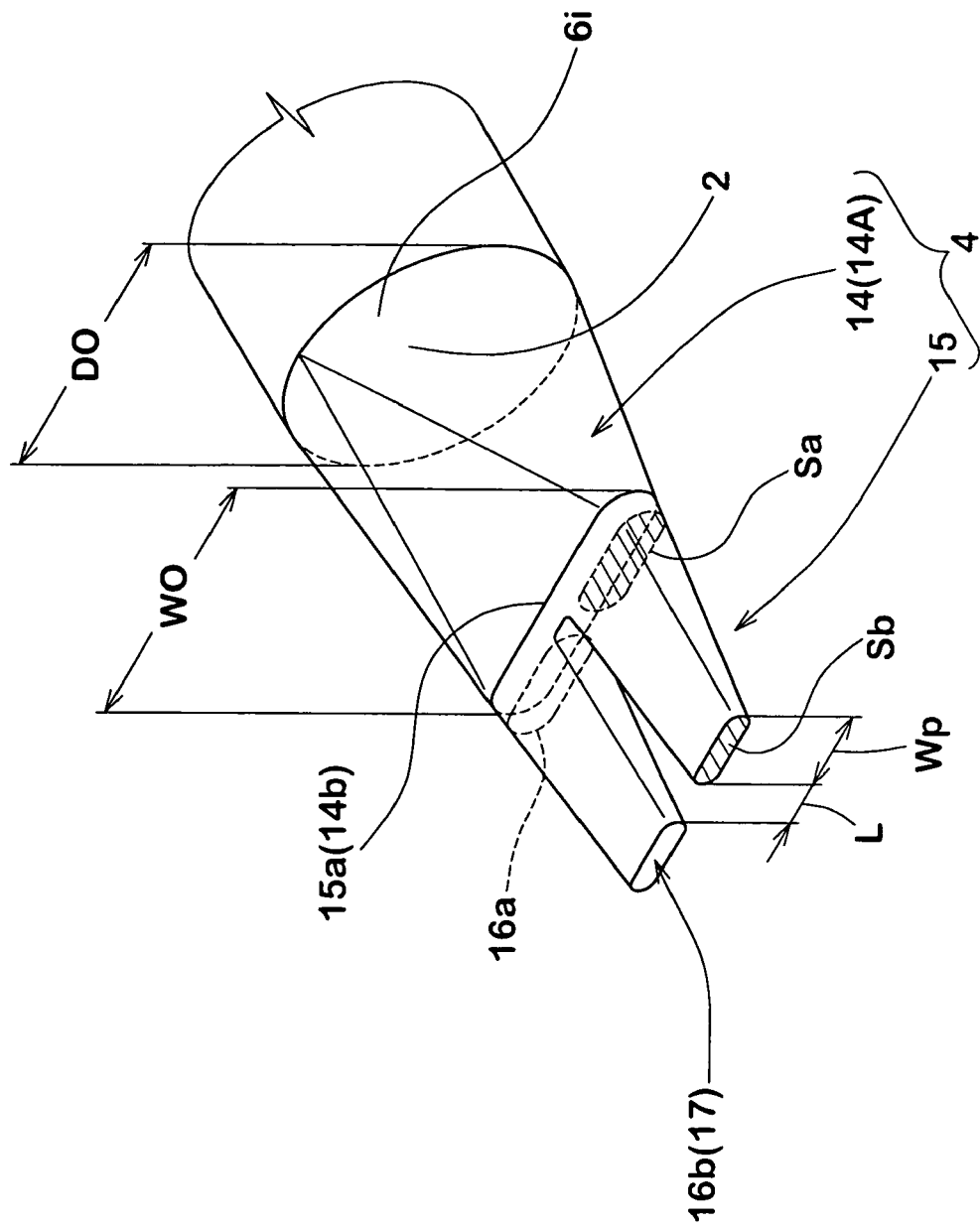
FIG. 4 is a perspective view of the rubber passage.

As shown in FIG. 4, the first passage part 14 has a changing portion 14A at which a cross sectional shape thereof is smoothly changed from a circular shape to a laterally long flat shape toward the mouthpiece 12. Although the cross sectional shape of the first passage part 14 is continuously changed from the inlet port 6i in this embodiment, the first passage part 14 may include an extending portion having the same cross sectional shape as that of the inlet port 6i.

Figure 3A:
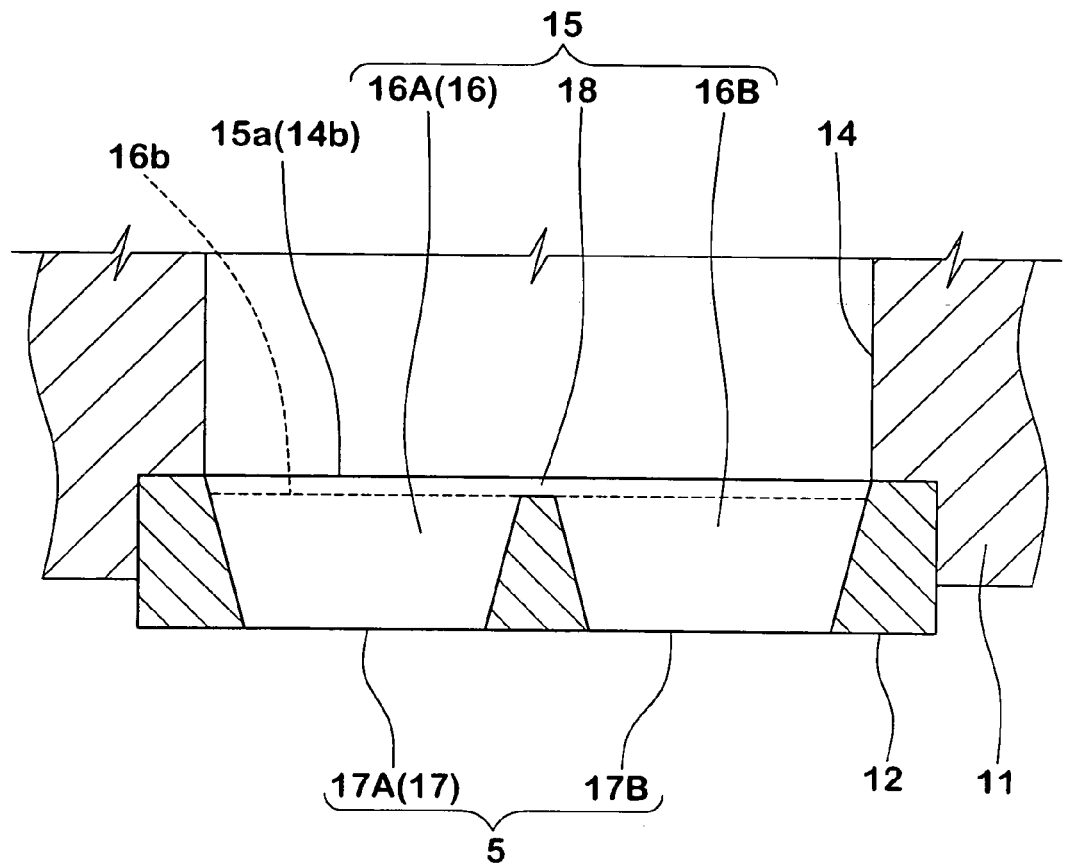
FIG. 3(A) is an enlarged sectional view of a rubber passage in its widthwise direction.

As shown in FIGS. 3 and 4, the second passage part 15 includes at least two branch passages 16A and 16B for distributing the compounded rubber from the first passage part 14 into the at least two outlet ports 17A and 17B. The branch passages 16A and 16B may be collectively called branch passages "16" in some cases, and the outlet ports 17A and 17B may be collectively called outlet ports "17" in some cases.

In this embodiment, the second passage part 15 further includes one joint passage 18 connected to the first passage part 14 and the branch passages 16A and 16B.

Each of the two branch passages 16 is tapered such that a height and a width of its cross sectional shape become smaller toward the outlet ports 17 with this design, the compounded rubber passing through each branch passage 16 gradually receives high pressure toward the outlet ports 17, and the rubber is precisely extruded with its cross sectional shape which is equal to the outlet port 17.

Figure 3B:
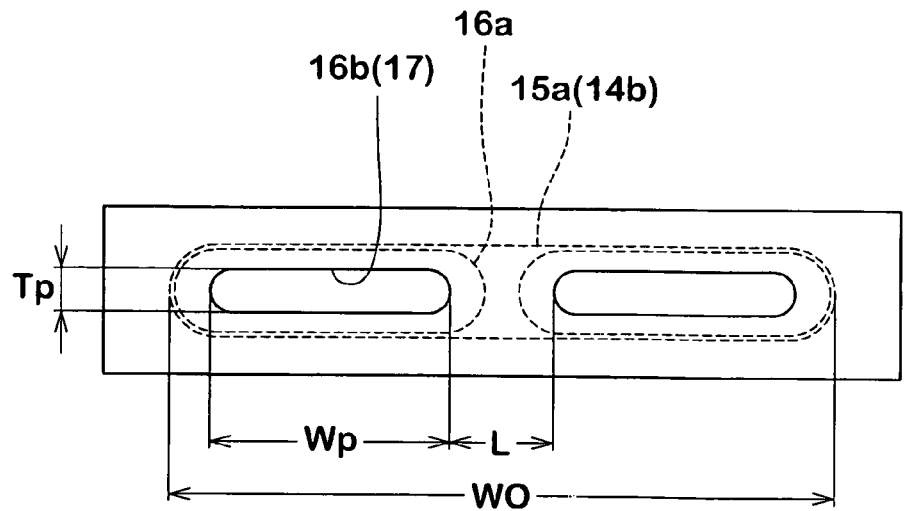
FIG. 3(B) is a front view showing a mouthpiece.

FIG. 3(B) shows an upstream opening 16a and a downstream opening 16b (corresponding to the outlet port 17) of the branch passages 16. A ratio ($\Sigma Sb/\Sigma Sa$) of a total sum $\Sigma Sa$ of an opening area Sa of the upstream opening 16a to a total sum $\Sigma Sb$ of an opening area Sb of the downstream opening 16b is preferably in a range of from 0.25 to 0.5. If the ratio ($\Sigma Sb/\Sigma Sa$) is greater than 0.5, air in the compounded rubber can not be removed enough, and there is a tendency that uniform material of the rubber can not be obtained. If the ratio ($\Sigma Sb/\Sigma Sa$) is smaller than 0.25, on the other hand, there is a tendency that the extruding speed of the rubber is extremely decreased due to material volume difference.

In this embodiment, the outlet port 17 has a laterally long elliptic cross sectional shape, its width Wp is 0.1 to 1.0 times, more preferably 0.5 to 1.0 times of the strip width Ws, and its thickness Tp is 1.0 to 10.0 times, more preferably 1.2 to 3.0 times of the strip thickness Ts. In this embodiment, cross sectional shapes of the two outlet ports 17 are substantially the same. If the width wp and thickness Tp of the outlet ports 17 are largely different from the strip width Ws and strip thickness Tp, working ratio of the roller head 7 becomes extremely great, and the sizes of the finished rubber strips Gs are prone to be varied. If the sizes of the outlet ports 17 and rubber strip are too close to each other, the extruding thickness from the outlet port 17 is reduced, the preliminary rubber strip Gp becomes wavy, and there is a tendency that the extruding stability is deteriorated.

It is preferable that at least two outlet ports 17A and 17B are separated from each other by a distance L in a range of from 2 mm to 100 mm in the widthwise direction of the rubber strip Gs. If the distance L is less than 2 mm, there is an adverse possibility that the extruded preliminary rubber strips Gp come into contact with each other. More preferably, the distance L is 5 mm or more. If the distance L is excessively long, the die 6 becomes large more than necessary. Thus, the distance L is preferably not more than 100 mm, further preferably not more than 20 mm.

The upstream opening 15a of the second passage part 15 has substantially the same cross sectional shape as that of the downstream opening 14b of the first passage part 14. As shown in FIG. 4, a width WO of the upstream opening 15a is set equal to or smaller than a diameter DO of the extrusion opening 2. When a rubber strip Gs having wide width is to be formed, however, the width wo may be set greater than the diameter DO. In this case, the width WO is preferably greater than a sum of a total width $\Sigma Wp$ of the outlet ports 17 and a total sum $\Sigma L$ of the distance L, i.e., WO>($\Sigma Wp+\Sigma L$). If WO$\leqq$($\Sigma Wp+\Sigma L$), rubber flow is deteriorated outside of the branch passages 16 in the widthwise direction, and there is a tendency that uniformity of shape and size of the preliminary rubber strips Gp is deteriorated.

The calendar head 7 includes the upper and lower calendar rollers 19U and 19L (collectively called calendar rollers 19) disposed in the vicinity of the die 6. The calendar rollers 19U and 19L are provided on the die 6 integrally through a holder 20 for example.

Figure 5:
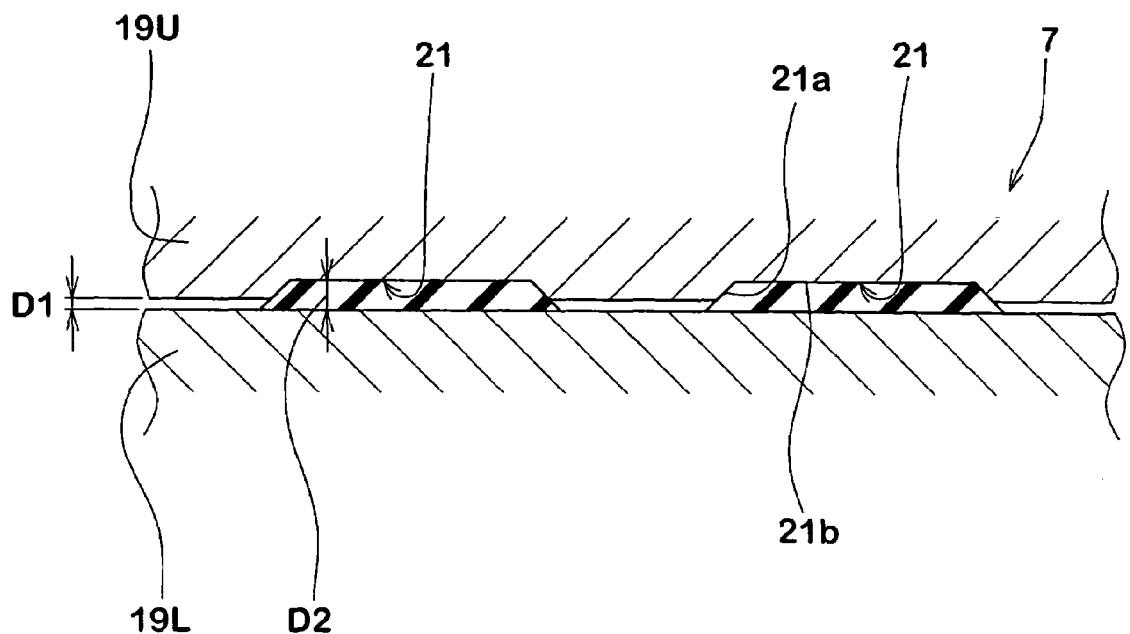
FIG. 5 is a front view of calendar rollers.

As shown in FIG. 5, in the calendar head 7, two parallel grooves 21 are provided on outer surface of at least one of the calendar rollers 19U and 19L. The grooves 21 extend circumferential direction of the roller in parallel to each other, and form the preliminary rubber strips Gp extruded from each outlet port 17 into finished rubber strips Gs with final finished cross sectional shapes. In this embodiment, the two grooves 21 in parallel to each other in the outer surface of the upper calendar roller 19U.

Each preliminary rubber strip Gp is rolled in a gap between the grooves 21 of the upper roller 19U and the outer surface of the lower calendar roller 19L, and two rubber strips Gs having the finished cross sectional shapes are produced simultaneously.

A cross sectional shape of the groove 21 has a flat bottom 21b, and side walls 21a extending from opposite ends of the bottom 21b in a direction increasing the groove width. With this design, as shown in FIG. 6, the finished rubber strip Gs having tapered opposite sides can easily be obtained. Further, a pair of side walls 21a of the groove 21 are useful to prevent that the rubber strip Gs is greatly extended by the width direction. Such a view point, a gap D1 between the outer surfaces except the grooves 21 of the rollers 19U and 19L is preferably not more than 0.5 times of a depth D2 of the groove 21. In this embodiment, the grooves 21 have the same cross sectional shapes.

As another embodiment, the cross sectional shapes of the outlet ports 17 and the cross sectional shapes of the forming grooves 21 may be different from each other. Such a apparatus 1 can simultaneously produce two finished rubber strips Gs having different cross sectional shapes. This is of utility for forming a laterally asymmetric tire rubber component.

The producing apparatus 1 described above can simultaneously and precisely form a plurality of (two, in this embodiment) rubber strips Gs using the one extruder 3. Therefore, it is possible to form rubber component efficiently by dual wind, and to reduce the number of extruders 3. Thus, the apparatus cost can be reduced, and space of factory can be saved.

According to the apparatus 1 of the invention, the rubber strip Gs immediately after it is rolled can be supplied directly to the tire former and thus, the rubber strip Gs can be maintained at a relatively high temperature. Therefore, the adhesion of the surfaces of the rubber strips Gs can be maintained, and they can be integrally bonded to each other strongly. Thus, it is possible to prevent the formed tire rubber component from being peeled off and damaged, and to produce a high quality pneumatic tire.

Further, according to the apparatus 1 of the embodiment, rubber strips Gs having different shapes can simultaneously be produced only by exchanging the mouthpiece 12. Therefore, a single wind method and a dual wind method can easily be switched. Although the preferable embodiments of the present invention have been explained in detail, the invention is not limited to the embodiments, and can variously modified and carried out.

The invention claimed is:

1. An apparatus for producing at least two rubber strips comprising:
    an extruder for extruding compounded rubber, said extruder comprising
        a main body having an extrusion opening, and
        a die attached to the main body, said die comprising
            an inlet port in communication with the extrusion opening of the main body,
            at least two outlet ports from which the compounded rubber is extruded into at least two preliminary rubber strips each having a preliminary cross sectional shape, and
            a rubber passage extending between the inlet port and the outlet ports so as to distribute the compounded rubber supplied from the inlet port to each outlet port; wherein
        said rubber passage has a first passage part extending between an upstream end and a downstream end thereof without branching, and a second passage part being connected to the downstream end of the first passage part and comprising at least two branch passages, and
        said each branch passage has an upstream opening and a downstream opening, and a ratio ($\Sigma Sb/\Sigma Sa$) of a total sum $\Sigma Sa$ of each opening area Sa of the upstream openings to a total sum $\Sigma Sb$ of each opening area Sb of the downstream openings is in a range of from 0.25 to 0.5.

2. The apparatus according to claim 1, wherein said die comprises a die head provided with the inlet port, and a mouthpiece mounted on the die head and provided with the outlet ports.

3. The apparatus according to claim 2, wherein the first passage part extends through the die body and the second passage part extends through the mouthpiece.

4. The apparatus according to claim 2, wherein said mouthpiece is mounted on the die head such that the mouthpiece can be exchanged.

5. An apparatus for producing at least two rubber strips comprising:
    an extruder for extruding compounded rubber, said extruder comprising
        a main body having an extrusion opening, and
        a die attached to the main body, said die comprising
            an inlet port in communication with the extrusion opening of the main body,
            at least two outlet ports from which the compounded rubber is extruded into at least two preliminary rubber strips each having a preliminary cross sectional shape, and
            a rubber passage extending between the inlet port and the outlet ports so as to distribute the compounded rubber supplied from the inlet port to each outlet port; wherein
        said rubber passage has a first passage part extending between an upstream end and a downstream end thereof without branching, and a second passage part being connected to the downstream end of the first passage part and comprising at least two branch passages, and
        each branch passage is tapered such that a width and a height of the cross section shape thereof are both reduced toward the outlet port, and
        said each branch passage has an upstream opening and a downstream opening, and a ratio ($\Sigma Sb/\Sigma Sa$) of a total sum $\Sigma Sa$ of each opening area Sa of the upstream openings to a total sum $\Sigma Sb$ of each opening area Sb of the downstream openings is in a range of from 0.25 to 0.5; and
    a pair of calendar rollers for simultaneously forming said at least two preliminary rubber strips into at least two rubber strips each having a finished cross sectional shape.

6. The apparatus according to claim 5, wherein said die comprises a die head provided with the inlet port, and a mouthpiece mounted on the die head and provided with the outlet ports.

7. The apparatus according to claim 6, wherein said the first passage part extends through the die body and the second passage part extends through the mouthpiece.

8. An apparatus for producing at least two rubber strips comprising:
    an extruder for extruding compounded rubber, said extruder comprising
        a main body having an extrusion opening, and
        a die attached to the main body, said die comprising
            an inlet port in communication with the extrusion opening of the main body,
            at least two outlet ports from which the compounded rubber is extruded into at least two preliminary rubber strips each having a preliminary cross sectional shape, and
            a rubber passage extending between the inlet port and the outlet ports so as to distribute the compounded rubber supplied from the inlet port to each outlet port; wherein
        said rubber passage has a first passage part extending between an upstream end and a downstream end thereof without branching, and a second passage part being connected to the downstream end of the first passage part and comprising at least two branch passages, and
        said each branch passage has an upstream opening and a downstream opening, and a ratio ($\Sigma Sb/\Sigma Sa$) of a total sum $\Sigma Sa$ of each opening area Sa of the upstream openings to a total sum $\Sigma Sb$ of each opening area Sb of the downstream openings is in a range of from 0.25 to 0.5; and
    a pair of calendar rollers for simultaneously forming said at least two preliminary rubber strips into at least two rubber strips each having a finished cross sectional shape.

9. The apparatus according to claim 8, wherein said outlet ports have substantially the same cross sectional shapes.

10. The apparatus according to claim 8, wherein said outlet ports are separated from each other by a distance of from 2 mm to 100 mm in a widthwise direction of the rubber strip.

11. The apparatus according to claim 8, wherein at least one said calendar roller is provided with at least two parallel grooves extending along the circumferential direction of the roller for forming at least two rubber strips.

12. The apparatus according to claim 11, wherein said grooves have substantially the same cross sectional shapes.

13. The apparatus according to claim 11, wherein said grooves each have a flat bottom, and a pair of side walls each extending from ends of the bottom in a direction increasing a groove width.

14. The apparatus according to claim 8, wherein said first passage part is longer than each branch passage.

15. The apparatus according to claim 8, wherein said die comprises a die head provided with the inlet port, and a mouthpiece mounted on the die head and provided with the outlet ports.

16. The apparatus according to claim 15, wherein said the first passage part extends through the die body and the second passage part extends through the mouthpiece.

* * * * *